Patented July 5, 1938

2,122,889

UNITED STATES PATENT OFFICE 2,122,889

PROCESS FOR THE PRODUCTION OF ACETYLENE

Otto Mues, Frankfort-on-the-Main-Schwanheim, Germany, assignor to I. G. Farbenindustrie Aktiengesellschaft, Frankfort-on-the-Main, Germany No Drawing. Application June 18, 1936, Serial No. 85,845. In Germany June 22, 1935

4 Claims. (Cl. 48—216)

The present invention relates to a process for the production of acetylene from calcium carbide and water.

The calcium hydroxide formed in the production of acetylene by the action of water on calcium carbide, encases the carbide more or less and thus hinders further access of water to it. In this manner the speed of production of the gas is diminished, and in consequence of the hindered removal of heat polymerization phenomena are apt to occur. Moreover, moisture contained in the mud or the water necessary for the formation of calcium hydroxide, which water becomes liberated when the hydroxide is decomposed, is the source of undesired subsequent gasification, the control of which is not practicable.

Gasification processes have already been described in which the subsequent gasification is more or less completely avoided. In these processes the water necessary for the gasification is added in doses with constant mixing of the carbide with the calcium hydroxide produced. The proportion of added water is so adjusted that a practically dry calcium hydroxide is produced. In contrast with the usual acetylene generator in which calcium hydroxide is left in the excess of water in the form of mud, in the known process there is the advantage that there is little after-gasification. On the other hand, there still persists a possibility that by encasing the pieces of carbide the calcium hydroxide will prevent the access of water, whereby the speed of gasification is diminished and the danger of the formation of polymerization products arises.

The present invention relates to a process in which not only is after-gasification diminished or avoided, but also there is no hindrance to the speed of gasification and the danger of polymerization phenomena is avoided. The invention is based on the idea of separating as quickly as possible after its production the calcium hydroxide from the calcium carbide. In this manner the water always has access to a clean surface of carbide whereby the highest speed of gasification is obtained. Moreover, the danger of polymerization no longer exists because the cooling action of the arriving water is fully used in absorbing the heat of the reaction. Finally, there is an extraordinarily small after-gasification, since the water contained in the calcium hydroxide produced, in consequence of its immediate removal from the sphere of action, cannot attack the carbide. As in the known process, only so much water is added that a practically dry calcium hydroxide is produced. This product is separated from the calcium carbide, according to the invention, by stirring the mixture containing the components during the gasification and exposing simultaneously the hydroxide thereby detached from the carbide to the action of the current of inert or combustible gases or mixtures of such gases. Examples of inert gases may be nitrogen or carbon dioxide, as combustible gases there may be named hydrogen, carbon monoxide, mixtures of these gases or acetylene, for instance the acetylene produced in the apparatus itself. These gases separate, in the manner of a wind-sifter, the pulverulent light hydroxide from the heavy pieces of carbide, carrying it forward from the gasification chamber into another chamber in which it can settle. If the acetylene produced in the apparatus itself is used as the gas current, it may be circulated, that is to say it may be returned from the settling chamber into the gasification chamber. The gas not used in the circulation leaves the generator at a suitable point.

I claim:

1. A process for the production of acetylene from calcium carbide which comprises adding only so much water to the calcium carbide as is necessary for the production of acetylene and a practically dry calcium hydroxide while simultaneously stirring the mixture of calcium carbide, and calcium hydroxide formed during the process and separating the calcium hydroxide from the calcium carbide by the action of a current of an inert gas conducted therethrough with such a speed as to carry away the calcium hydroxide having been detached by the mechanical stirring.

2. A process for the production of acetylene from calcium carbide which comprises adding only so much water to the calcium carbide as is necessary for the production of the acetylene and a practically dry calcium hydroxide while simultaneously stirring the mixture of calcium carbide, and calcium hydroxide formed during the process and separating the calcium hydroxide from the calcium carbide by the action of a current of acetylene conducted therethrough with such a speed as to carry away the calcium hydroxide having been detached by the mechanical stirring.

3. A process for the production of acetylene from calcium carbide which comprises adding only so much water to the calcium carbide as is necessary for the production of acetylene and a practically dry calcium hydroxide while simultaneously stirring the mixture of calcium carbide, and calcium hydroxide formed during the process and separating the calcium hydroxide from the calcium carbide by the action of a current of an inert gas conducted therethrough with such a speed as to carry away the calcium hydroxide having been detached by the mechanical stirring, the gas being passed in a circulating stream.

4. A process for the production of acetylene from calcium carbide which comprises adding only so much water to the calcium carbide as is necessary for the production of acetylene and a practically dry calcium hydroxide while simultaneously stirring the mixture of calcium carbide, and calcium hydroxide formed during the process and separating the calcium hydroxide from the calcium carbide by the action of a current of acetylene conducted therethrough with such a speed as to carry away the calcium hydroxide having been detached by the mechanical stirring, the acetylene being passed in a circulating stream.

OTTO MUES.